Aug. 7, 1923.
G. A. HENDERSON
1,464,481
BITUMINOUS MASTIC AND PROCESS FOR MAKING AND APPLYING THE SAME
Filed Jan. 5, 1921
2 Sheets-Sheet 1
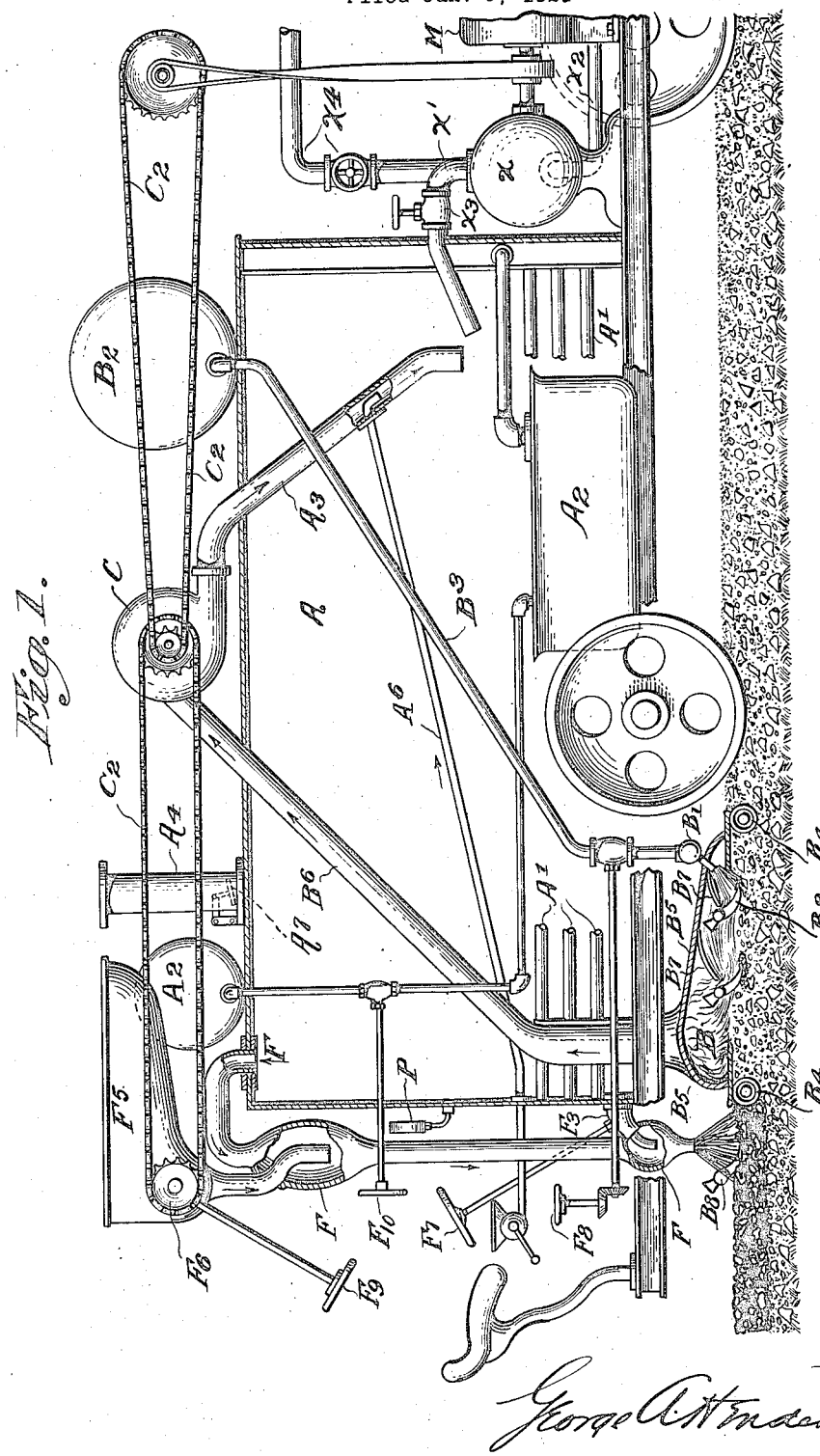

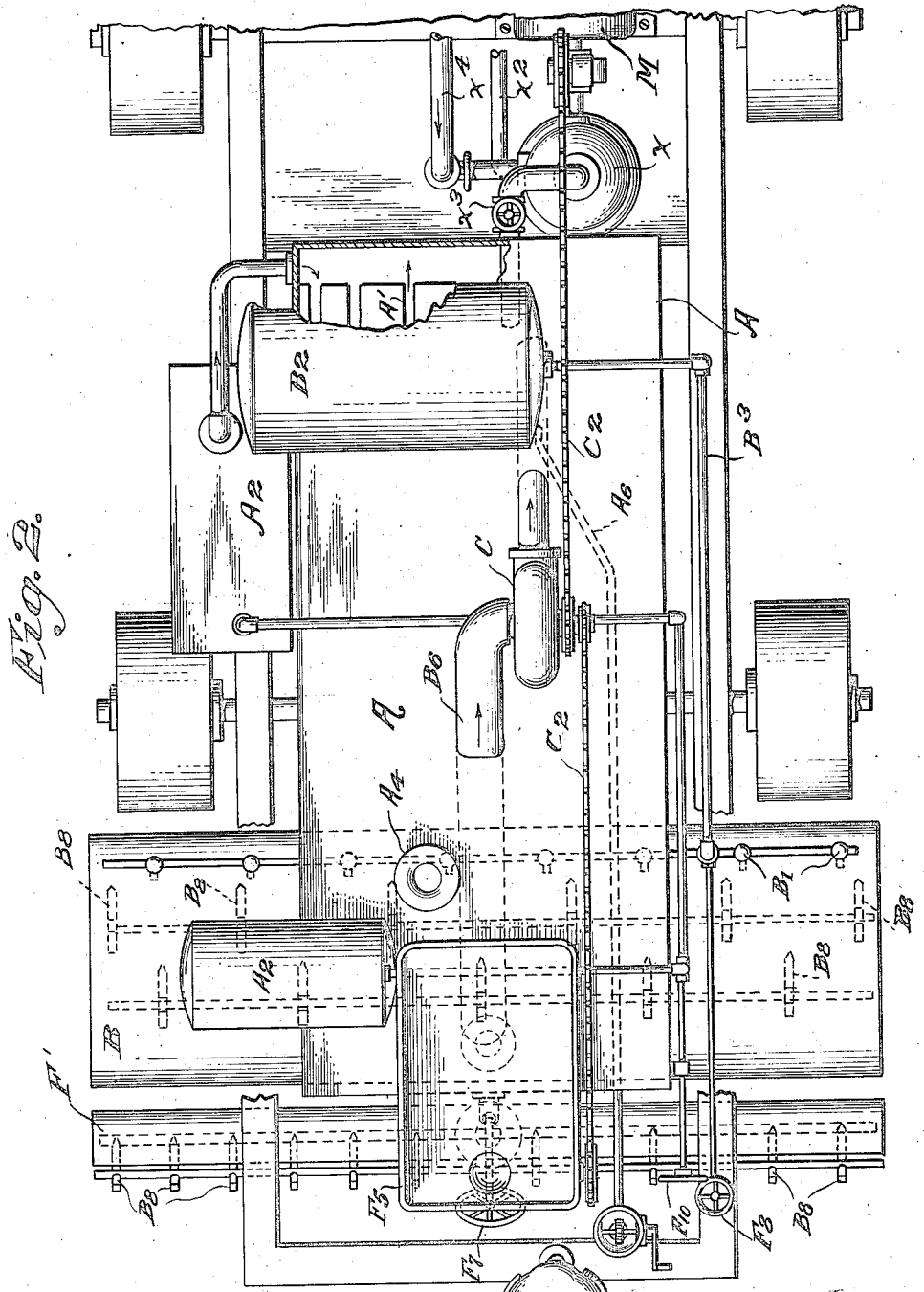

Patented Aug. 7, 1923.

1,464,481

UNITED STATES PATENT OFFICE.

GEORGE A. HENDERSON, OF CHARLESTON, WEST VIRGINIA.

BITUMINOUS MASTIC AND PROCESS FOR MAKING AND APPLYING THE SAME.

Application filed January 5, 1921. Serial No. 435,186.

*To all whom it may concern:*

Be it known that I, GEORGE A. HENDERSON, a citizen of the United States, residing at Charleston, in the county of Kanawha and State of West Virginia, have invented certain new and useful Improvements in Bituminous Mastics and Process for Making and Applying the Same, of which the following is a specification.

My invention relates to bituminous cements in combination with vulcanizing chemicals and colloidal mineral dust, forming a mastic, and the manner of its agglomeration with mineral aggregates for paving and other purposes; and my objects are to more completely effect, and to accelerate, vulcanization of the bitumen with sulfur and to colloidally suspend the dust therein, mechanically mixed with additional dust, and to thus provide improved means improving those present in my United States Patent No. 1,370,815 (application Ser. No. 212,194, filed Jan. 15, 1918) for its preparation for use in pavement and like aggregates.

Means known to the prior art require much time and heat to combine a small quantity of sulfur in its usual form with bitumen, fail in suspending in truly colloidal state impalpable dust therein; and, in the "penetration method" known to the trade, of bituminizing a macadam road in situ, the bitumen is reduced to permanent fluidity by fluxing it and by adding lighter oils thereto, producing more of a lubricating dust-layer than a binder of the aggregate. In a modification of the latter practice a more viscous bituminous binder is temporarily liquefied by the addition thereto of naphtha in order that the fluid may penetrate the interstices of the aggregate in situ and, on subsequent evaporation of the naphtha, harden therein and bind the aggregate together; but this method is now found to be commercially inoperative because of the prohibitive costs of the said reducing agent, naphtha.

It is also known that surface and interstitial dust (or that finely divided mineral matter ground to impalpability by traffic and leached within the road by water, in time), interferes with the penetration of a binder therein, as well as with the binder adhering to the larger particles of stone sought to be bitifminized in the prior art; that the atmospheric temperature of such aggregate prematurely congeals heated bitumen before it has an opportunity of entering the road when sprayed thereover; and that such interstices as may be filled with bituminous compounds, contain no stiffening agency such as impalpable mineral dust suspended in the bituminous compound (as in the known "mixing method") which filler-dust gives increased stability to such a structure and is more economical than if merely the pure bitumen be used.

In carrying out my invention I preliminarily prepare a bituminous mastic by injecting in steam suspension about 38% by weight of mineral (preferably clay) dust of truly colloidal nature mixed with from 6% to 15% (by wt. of the hereinafter specified bitumen) of a vulcanizing substance such as sulfur, about 3% sodium sulfate and about 1% of copper sulfate (acting chemically as hereinafter described and with the disperse clay dust as catalyzers and stabilizers in the formative period of my product) into the bottom of a vat containing from 43% to 52% of a hydrocarbon of the cyclic series such as the residuum of asphaltic base petroleum from which the lighter oils, such as benzine, kerosene, and its nitrogenous derivatives have been driven off by heat, and of about 50 standard penetration as tested for consistency, which bitumen has been heated in the vat to a temperature of about 350–375 deg. Fahr.; and I agitate the mass therein under the influence of sustained heat and suction until merely the major portion of the moisture in the form of steam which has acted as a carrying agent to disperse the colloidal particles of dust throughout the bitumen, has been eliminated from the vat, and until hydrogen sulfide gas has just begun to be formed therein of said ingredients. I then remove the mastic from the vat and permit it to cool in (preferably portable) containers.

Referring to the drawings. Fig. 1 is a side elevation in partial section of portable apparatus adapted for carrying out the subsequent steps of my invention, now to be described, and Fig. 2 is a plan view thereof. In an auxiliary pre-heater I preliminarily reheat the previously prepared mastic, and by the operation of pump X, maintain constant agitation of the mastic in the heater and afford a constant supply thereof in continuous flow, regulated by cocks X³ from the heater through pipe X², pump X and pipe X³ to vat A. By means of steam or oil-vapor heat, supplied to pipes A' in vat A through apparatus A² from source not necessary to be here shown, I subject the mass in vat A to sustained heat, and during the formation and expansion of hydrogen sulfide gas therein I agitate the mass and provide additional pressure by injecting hot air, acting as a carrying agent of additional chemicals, hereinafter described, and dust, such as may be first blown out of the interstices of a previously scarified stone road over which the machine is propelled by traction. A battery of fuel oil burners B', operated under pressure from supply b² through pipe B³, impinge approximately 1000 cu. ft. per minute of flame mixed with air into the open interstices of the scarified aggregate on the road while the mass is being turned by tines B⁸ to loosen and to remove the dust therefrom and heat the stone in the closure B which is an asbestos fabricated steel hood, traveling on rollers B⁴ and hinged at the points B⁵, converging to pipe B⁶ leading to an exhauster C operated by pulley C' with chain drive C² from motor M (Fig. 1).

The flame and hot air from the burners B' are preferably baffled in their course backward in the hood B, by fabricated steel members B⁷ so that they have a serial pass on the surface of the road from their inclination to rise in their backward course, to aid in removing the dust and to heat all parts of the stone in the operation.

The heat from burners B' is partially used in the hood B for the purpose described, and the remaining hot air in hood B, is sucked up by exhauster C, carrying with it such finely divided mineral dust as may be susceptible of being so carried in air suspension, through exhauster C into and through discharge pipe A³ into the vat, where the hot air aids in causing the ebullition of the bitumen therein in the manner hereinafter described, and in which vat A the additional dust is entrapped in suspension of the bitumen. Pressure is caused in vat A by the forced injection therein of said heated air, and by the interaction of the chemicals forming gases hereinafter described. However, it is designed that said pressure shall at no time exceed that in pipe A³, of smaller dimension than supply pipe B⁶, in which pipe (A³) all dust and air from pipe B⁶ is compressed by exhauster C; the pressure in vat A being relieved as created by the constant outflow of all residual gases, fumes and heated air and steam through pipe F leading from the top of vat A to penetration nozzle F' extending cross-wise of the surface under treatment, behind hood B, at which point the gases and air, then acting as carrying agents of the mastic in the manner hereinafter shown, escape to the atmosphere while impinging the mastic by impact of the mass on to the dust-cleared, scarified and heated aggregate while that aggregate is being again turned by tines F², set within the area then being coated with the mastic, during the course of the machine forward. It is designed that pipe F shall, during operation of the apparatus, uninterruptedly carry exceeding 1000 cu. ft. of residual gases, steam, air and fumes, per minute, and that these vapors shall simultaneously act as the carrying agent suspending approximately two cu. ft. (measured as solid matter) of mastic dispersed therein per minute of operation, in the case of resurfacing a stone road.

The pressure in vat A is fixed by valve A⁴ automatically operable by pressure slightly under that in pipe A³, it being designed, however, that the outflowing gases and air will more or less equalize the pressure caused by their creation and expansion in vat A and as augmented by the air and mastic continuously injected therein. The pressure in vat A is preferably indicated by register P, set within sight of the operator.

The mastic itself, in honey-combed, cellular condition, as hereinafter more specifically described, passes by gravity, as well as by being forced by the pressure, out of the vat A through discharge pipe F³, by the action of the discharged gases, etc., in which pipe said mastic is also sucked out of the vat A and, in its passage through pipe F, mixed with the steam, gases, and hot air, and with additional dust from bin F⁵ equipped with revolving ball valve F⁶ designed to deposit dust in air suspension into pipe F by the influence of said suction therein at the time, which additional dust is preferably of colloidal nature, and is designed to be sufficient in quantity to adsorb any excess bitumen and to act as a further filler of the mastic in the final product of the process. The quantity of added dust from the bin F⁵ and the quantity of mastic with which it is mixed in its course to the surface to be coated, are both regulated manually by an operator stationed at the controls F-7, 8, 9 and 10, as shown, consistent with the capacity of the spraying nozzle, and the speed of the machine forward.

When the mass in vat A is subjected to the heat aforesaid, hydrogen sulfide gas is therein formed and expanded. I then, in a continuous operation, gradually inject into the mass in vat A, through receptacle A⁵ and pipe A⁶ to pipe A³, during the above described steps of the process, about two per cent of hydrochloric acid, which interacts with the soluble salts aforesaid, and with the hydrocarbons and sulfur under the influence of said heat, to form sulfur dioxide and chlorine gases in the mass. As accelerators of vulcanization of the bitumen by these gases, interacting alternately with each other as hereinafter described, I add 1% nitrobenzene ($C_6H_5NO_2$) (a derivative of nitric acid and coal tar, as distinguished from benzine, a product of petroleum), followed by 1% of nitro-phenol (a compound of nitric and carbolic acids) and about one-half of one per cent of the derivatives of aldenydic bodies, ammonia and amines, such as formaldenyde-aniline or hexamethylenetetramine; and I have noted that when the resultant sulfur dioxide gas, alternately interacts with the hydrogen sulfid gas in the presence of the residual moisture from the steam specifically retained in the mastic up to this point of the process for the purpose, and the injected air, a honey-combed (and constantly changing cellular condition of the mass) is formed, on the thin films of which vulcanizable bitumen the vulcanizing substances act in the nascent period, upon complete dehydration of the mass by the removal of its residual moisture content,—probably on the instant of their liberation from their original compounds, to effect complete and almost instantaneous vulcanization of the bitumen under said moderate degree of heat and pressure.

I have noted that the sulfur so combined with the bitumen is an entirely different form from that usually used and from any that has been heretofore sought to be chemically combined in the vulcanization of bitumen, and I have likewise noted that the resultant product is much more ductile, with a higher melting or flow point, less affectable by oils or acids, and insoluble in the usual solvents such as carbon-disulphide, as compared with other such products of which I have knowledge.

While there may be some additional chemical reactions in the mass from the residual gases after their interaction in the nascent periods mentioned, I rely on these weaker gases in the further formative period merely to maintain temporary fluidity of the mass in its cellular condition, in order that great volumes of gas, air and bitumen, carrying in suspension the mineral dust, may be expelled from the vat through pipe F and sprayed on the surface to be coated therewith in the manner aforesaid.

In the case of a macadam highway, in example, the quantities of my mastic so applied shall be sufficient merely to coat the larger stone particles in situ, to completely fill their interstices and to bind the particles together in a homogeneous mass monolithic of the undisturbed metal, composing the macadam base, with which it is mechanically interlocked, with from 2½" to 3" in thickness of bituminous concrete, in which the larger aggregate shows on the surface in mosaic-like appearance, when compacted by rolling, to shape while all of the ingredients are hot.

I have noted that on impinging, by impact of the said blasts, on the surface to be coated, the gases and air escape at once to the atmosphere and the residual mastic sets to a stable mass and hardens upon cooling to atmospheric temperature; so that with the mastic the desired thickness of which coating will depend on the capacity of the spraying nozzles, the material supplied thereto, the capacity of the apparatus as a whole and the manual manipulation of the supply controls, consistent with the time of concentration of the discharged mass over a given area.

In the continuous operation, I prefer to provide two preheating units for the mastic, one being charged while the other is continuously feeding the heated mastic through pump X to vat A during its operation, this supply of mastic to vat A being regulated by the cock $X^3$, to approximately equalize the quantity of mastic passing out of vat A through pipe F, in the manner above described, and maintaining, during the operation, a quantity of mastic in vat A equivalent to approximately two thirds its holding capacity.

I claim:

1. The process of treating a broken stone road, consisting in producing a vulcanized mastic consisting in injecting colloidal mineral dust mixed with powdered sulfur, sodium sulfate and copper sulfate in steam suspension to preheated bitumen in a vat, and subjecting the mass to heat to produce hydrogen sulfid gas within, and a cellular condition of, while dehydrating the same; then injecting into the mass in heated air suspension additional mineral dust mixed with hydrochloric acid to act on the salts and hydrocarbon to form sulfur dioxide and chlorine gases within the said cells: then adding a small quantity of hexamythelene to accelerate vulcanization of the mass by the sulfurous gases while agitating the same under the influence of sustained heat and forcing the cellular mass, mixed with residual gases and air out of the vat through a pipe while sucking therein additional colloidal mineral dust; and then impinging the mast through a nozzle, during escape of its gases, onto and within the interstices of previously scarified, dust-cleared and heated aggregate of the road in substantial situ while turning the same; then compacting the scarified material to shape.

2. The process of producing a vulcanized mastic, consisting in producing a vulcanized mastic consisting in injecting colloidal mineral dust mixed with powdered sulfur, sodium sulfate and copper sulfate in steam suspension to preheated bitumen in a vat, and subjecting the mass to heat to produce hydrogen sulfid gas within, and a cellular condition of, while dehydrating the same; then injecting into the mass in heated air suspension additional mineral dust mixed with hydrochloric acid to act on the salts and hydrocarbon to form sulfur dioxide and chlorine gases within said cells; then adding a small quantity of hexamethylenetetramine ($C_6H_5NO_2$) to accelerate vulcanization of the mass by the sulfurous gases while agitating the same under the influence of sustained heat and forcing the cellular mass, in a continuous operation, mixed with residual gases and air, out of the vat through a pipe, and, while sucking therein additional mineral dust, impinging the mastic on the surface to be covered through an atomizing nozzle during escape of residual gases and air from the mastic.

3. A bituminous concrete wearing surface integral of a broken stone base, consisting of mineral aggregate coated, impregnated and bound and having its interstices filled with a bituminous mastic consisting of from 43% to 52% of bitumen combined with and having suspended therein a mixture of from 48% to 58% of truly and exclusively colloidal mineral dust, sodium sulfate, copper sulfate and sulfur derivatives.

4. A bituminous concrete wearing surface in thickness one and one-half inches to three inches, monolithic of and interlocking with a bituminized macadam base, consisting of mineral aggregate the interstices between which are filled with a bituminous mastic consisting of from 43% to 52% of bitumen combined with and having suspended therein a mixture of 48% to 57% of impalpable mineral dust of exclusively colloidal sizes sodium sulfate, copper sulfate and sulfur derivatives.

In witness whereof, I have hereunto set my hand in the presence of two witnesses this twenty-first day of December, 1920.

GEORGE A. HENDERSON.

In the presence of—
   GEO. M. McDERMIT,
   EMMA ASH McDERMIT.